J. SNOWBERGER.

Assignor of three-fourths to U. G. KIRN, L. A. SMITH & O. CASE.

OILER AND WIPER FOR COMMUTATORS.

No. 10,816. Reissued Mar. 8, 1887.

WITNESSES

Phil. L. Dieterich.

A. E. Dowell.

INVENTOR

Jacob Snowberger.

by: W. Alexander

Attorney

UNITED STATES PATENT OFFICE.

JACOB SNOWBERGER, OF AKRON, OHIO, ASSIGNOR OF THREE-FOURTHS TO U. GRANT KIRN, LOUIS A. SMITH, AND ORLANDO CASE, ALL OF SAME PLACE.

OILER AND WIPER FOR COMMUTATORS.

SPECIFICATION forming part of Reissued Letters Patent No. 10,816, dated March 8, 1887.

Original No. 338,197, dated March 16, 1886. Application for reissue filed January 11, 1887. Serial No. 224,069.

*To all whom it may concern:*

Be it known that I, JACOB SNOWBERGER, a citizen of the United States, residing at Akron, in the county of Summit and State of Ohio, have invented certain new and useful Improvements in Oilers and Wipers for Commutators, of which the following is a specification.

The object I have in view is to provide a device which shall automatically apply to the surface of a commutator for dynamo-electric machines a lubricant in such quantity as will prevent wear between it and the brush, will not prevent or impede the electric current, and will continuously wipe said surface.

My invention will be fully understood from the following description, when taken in connection with the annexed drawings, in which—

Figure 1:
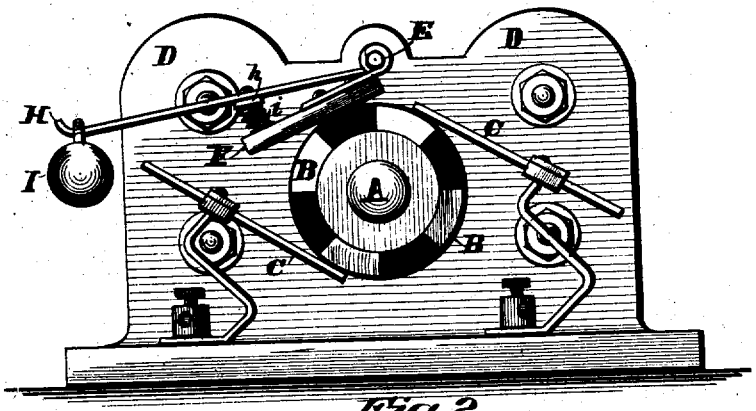
Figure 2:
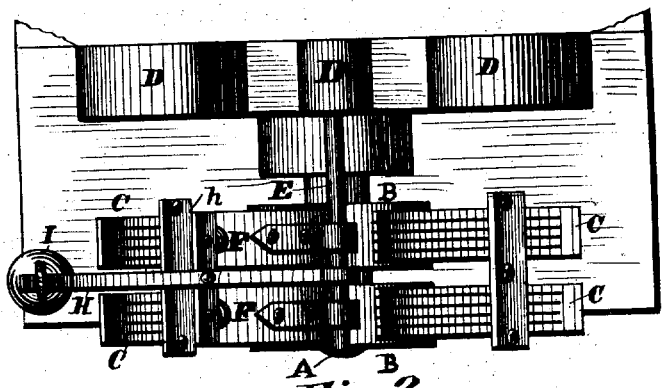
Figure 3:
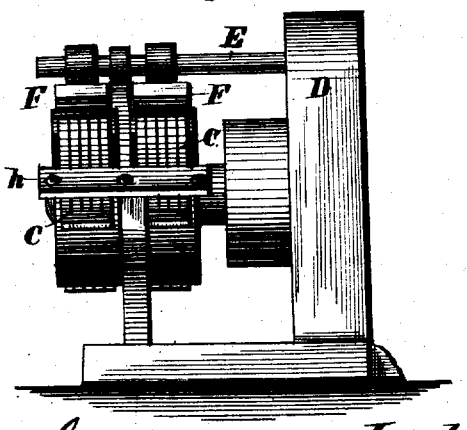

Figure 1 is an end elevation of a dynamo-electric machine, showing a commutator provided with my improved oiler and wiper; Fig. 2, a plan view of the same, the magnets and revolving armature being omitted; and Fig. 3 is a side elevation of Fig. 1.

The main shaft A of the machine bears at its outer end two commutators, B B, upon which rest the brushes C C.

Projecting from the frame D of the machine, and substantially parallel with the shaft A, is a slender rod or shaft, E, upon which are hinged at one end two blocks, F F. These blocks are of wood, and preferably of a soft fine-grained variety—such as whitewood, cucumber, bass-wood, and the like—and free from gums or resins, and each rests upon the face of one of the commutators, preferably with the grain of the wood substantially tangential to said face. Hinged to the same shaft, E, is an arm, H, on the outer end of which is a weight, I, and to which is attached a cross-piece, *h*, which extends over each block F. Between the ends of the cross-piece *h* and the blocks F F are springs *i*.

In operation the blocks F F are saturated with oil, and, all surplus being wiped off, are mounted on the shaft E and held in place by the arm H, cross-piece *h*, and springs *i i*. Thus arranged they not only afford a sufficient lubricant to prevent rapid wear of the brush and commutators, but continually wipe and polish the same.

It is obvious that each block F can be provided with a separate weighted arm, H, or the weight may be applied directly to the block, and a spring may be substituted for the weight I without any change in my invention, the essential feature being the saturated wood block resting lightly on the periphery of the commutator.

Having described my invention, I claim—

1. An oiler and wiper for commutators of dynamo-electric engines, consisting of a wood block saturated with lubricating substance, and arranged to rest on the periphery of said commutator, substantially as shown, and for the purpose specified.

2. The combination, with a commutator of a dynamo-electric machine, of a wood block saturated with a lubricating substance, and a weight or equivalent device adapted to press said block against said commutator, substantially as shown, and for the purpose specified.

3. The combination, with the commutator B, of the block F, weighted arm H, and spring *i*, all constructed and arranged to operate substantially as set forth, and for the purpose specified.

In testimony that I claim the foregoing as my own I have hereunto set my hand this 21st day of December, A. D. 1886.

JACOB SNOWBERGER.

Witnesses:
F. B. THEISS,
GEO. G. ALLEN.